United States Patent
Tschiersch et al.

(10) Patent No.: US 9,018,139 B2
(45) Date of Patent: Apr. 28, 2015

(54) METHOD FOR PRODUCING EXPANDED GLASS GRANULES AND EXPANDED GLASS GRANULES AND THE USE THEREOF

(75) Inventors: Ronald Tschiersch, Stutzerbach (DE); Monika Stiebert, Ilmenau (DE); Angelika Kuhne, Ilmenau (DE); Jurgen Driesner, Grafenroda (DE)

(73) Assignee: Liaver GmbH & Co. KG (DE)

( * ) Notice: Subject to any disclaimer, the term of this patent is extended or adjusted under 35 U.S.C. 154(b) by 124 days.

(21) Appl. No.: 13/521,914

(22) PCT Filed: Jan. 6, 2011

(86) PCT No.: PCT/EP2011/050118
§ 371 (c)(1),
(2), (4) Date: Jul. 12, 2012

(87) PCT Pub. No.: WO2011/086024
PCT Pub. Date: Jul. 21, 2011

(65) Prior Publication Data
US 2013/0029885 A1    Jan. 31, 2013

(30) Foreign Application Priority Data
Jan. 12, 2010    (DE) .......................... 10 2010 000 049

(51) Int. Cl.
*C09K 8/03*    (2006.01)
*C03B 19/10*    (2006.01)
*C03C 11/00*    (2006.01)

(52) U.S. Cl.
CPC ............. *C03B 19/108* (2013.01); *C03C 11/007* (2013.01)

(58) Field of Classification Search
CPC ..... Y02E 10/125; Y02E 10/50; Y02E 60/122; C03B 19/108; C03C 11/007; C04B 38/065; C04B 35/00; C04B 38/0051; C04B 38/0605; C04B 38/0645; C04B 14/22; C04B 40/0263; C04B 28/26; C04B 22/062; C04B 40/0259; C04B 40/0268; C04B 20/04; C04B 20/1055; C08B 3/08; C08F 251/02; C08J 2375/02; C08J 9/0066; C08K 5/09; C08K 5/52; C08L 101/00; Y10S 215/06; Y10S 604/905; Y10S 65/03

See application file for complete search history.

(56) References Cited

U.S. PATENT DOCUMENTS

| 3,321,414 | A | * | 5/1967 | Vieli .............................. 521/188 |
| 3,744,984 | A | * | 7/1973 | Sato ................................. 65/22 |
| 4,086,098 | A | * | 4/1978 | Le Ruyet et al. ............. 106/668 |

FOREIGN PATENT DOCUMENTS

| CH | 539 004 | | 8/1973 |
| DE | 43 44 994 | | 7/1995 |
| DE | 4344994 | * | 7/1995 |
| DE | 103 34 997 | | 2/2005 |
| EP | 0661240 | * | 7/1995 |
| FR | 1 421 454 | | 12/1965 |
| FR | 1421454 | * | 12/1965 |
| JP | 55035350 | * | 9/1980 |
| JP | 58 060634 | | 4/1983 |
| RU | 02162825 | * | 10/2002 |
| WO | 2005/087676 | | 9/2005 |

* cited by examiner

Primary Examiner — Susannah Chung
Assistant Examiner — Kumar R Bhushan
(74) Attorney, Agent, or Firm — Ann Wieczorek; Mayer & Williams PC

(57) ABSTRACT

The invention relates to a method for producing expanded glass granules. To this end, starting materials are provided, comprising 80% to 95% glass and 5% to 20% sodium silicate hydrate having a water of crystallization content between 1 and 2 wt %, in relation to the solids content. After the glass is ground, the starting materials are mixed, the ground starting materials are granulated into raw granules, and the raw granules are mixed with a release agent, the mixture comprising the raw granules and the release agent is heated to a processing temperature. In a first partial step, the pores on the surfaces of the particles of the raw granules are closed, and in a second partial step, the water of crystallization is dissolved from the sodium silicate hydrate and caused to thermally expand, whereby the particles of the raw granules expand and form the expanded glass granules.

16 Claims, No Drawings

METHOD FOR PRODUCING EXPANDED GLASS GRANULES AND EXPANDED GLASS GRANULES AND THE USE THEREOF

The present invention relates to a method for producing expanded glass granules, which, inter alia, may be used as an additive or filler. The invention further relates to the expanded glass granules as such and a use of the glass granules.

EP 0 661 240 B1 shows foam glass granules and a method for producing the same. The starting materials used include a ground glass, a binder and an expanding agent. From the starting materials, raw granules are obtained which are foamed by a heat treatment method. The foam glass granules obtained are also referred to as expanded glass granules.

From DE 100 33 999 A1, a method for producing substantially open-pored granules is known, wherein inorganic amorphous fibers granulated and sintered.

U.S. Pat. No. 3,870,496 discloses a method for producing a foam glass, wherein the softening temperature of the glass to be processed is lowered by a hydroxide group containing material, such as water, methanol or ammonia. The hydroxide groups are supposed to change the crystal structure of the glass, for example, by forming the structure [Si—ONa, NaO—Si].

WO 2005/087676 A1 teaches a method for producing foam glass granules wherein water, pre-ground glass, sodium silicate and expanding agents are used as raw mixture. The raw mixture is ground wet for several hours and subsequently foamed by heating. The sodium silicate serves as a binder and as a fluxant. The sodium silicate is provided moist.

DE 43 44 994 A1 discloses a method for producing expanded glass granules wherein waste glass, sodium silicate, binders, organic blowing agents and water are used as starting materials. The sodium silicate is used in the form of a solution, for example $Na_2O.3SiO_2$, 40%.

DE 197 34 791 B4 discloses a method for producing open-pore expanded glass granules, wherein, inter alia, glass and waste glass are ground, granulated and expanded. Preferably, the expanding effect of organically polluted waste materials is utilized so that no further expanding agent is required. The open-pore expanded glass granules have the disadvantage that it absorbs a large amount of water making it unsuitable for many applications.

From DE 103 34 997 A1 an expanded glass composition and a process for producing the same are known. Expanded glass particles of the expanded glass composition are coated with a coating of a binder, so that only little water can penetrate into the expanded glass particles. A disadvantage of this solution is the additional effort that is required to coat the expanded glass particles. The water absorption is given in two different units. A first unit indicates the mass of water which has been absorbed after seven days. A second unit indicates the mass of water which is absorbed after thirty days. This information does not take into account the pressure with which the water is acting upon the expanded glass granules. It is not stated that an elevated pressure was set. In any event, the water absorption at elevated pressure is much higher.

EP 0 010 069 B2 discloses a method for producing foam glass granules by furnace expansion, which, on closer inspection, however, is foam glass gravel. A paste comprising water, sodium silicate, glycerol and sodium bentonite is used as a binder, fluxant, and expanding agents. Here, glycerol acts as an expanding agent.

From DE 198 37 327 A1 a flow concrete comprising preferably expanded glass as an additive, which has a bulk density of about 1.1 and consists of a non-absorbent material. The preparation of this expanded glass is not described.

WO 98/19976 A1 discloses a cement mortar with a light additive, which is preferably formed by spherical glass particles.

DE 101 46 806 B4 discloses a granular particle, which is preferably used as carrier for immobilizations in biotechnology. The granular particle consists of a light waterproof closed-pore core and a shell made of abrasion resistant material made of ceramic or glass-ceramic sintered material. The effective density of the entire particle is preferably between 1.05 $g/cm^3$ and 1.5 $g/cm^3$. The production costs are high for this granular particle, which is provided for special applications.

Based on the prior art, the object of the present invention is to provide expanded glass granules and a method for producing the same, which have very low water absorption, in particular under high pressures, and which may be produced at low cost. The particle gross density shall be adjustable, preferably to about 1 $g/cm^3$. Hence, a partial object is to produce particularly resistant expanded glass granules with a controllable particle gross density. Also, particularly advantageous uses of the expanded glass granules shall be identified.

The method according to the invention is used for producing expanded glass granules, such as may be used for example as an additive or filler. Initially starting materials shall be provided comprising 80% to 95% glass and 5% to 20% sodium silicate hydrate. The above percentages, as well as all subsequent percentages are based on the mass fraction, unless indicated otherwise. The sodium silicate hydrate is a sodium silicate initially preferably present in aqueous emulsion, having water of crystallization incorporated in the lattice, or being incorporated into the activated glass surface in a subsequent compacting process. The water of crystallization content is about 1 to 2%. The provided starting materials, in particular the glass shall be ground and mixed with the sodium silicate hydrate. The mixing can take place for example by distributing the sodium silicate hydrate in aqueous solution onto the ground glass.

The starting materials can be ground together or individually, unless they are already present in fine-grained form. The ground raw materials have a particle size of, for example less than 100 μm. In a further step of the method according to the invention, the ground starting materials shall be granulated, creating the raw granules. A plurality of particles of the ground starting materials is bound in the individual granular particles of the raw granules. In a further step, the raw granules shall be mixed with a release agent. The proportion of the release agent shall be chosen such that it is between 10% and 40% of the mixture comprising the raw granules. The release agent ensures that the granular particles of the raw granules stay loose in the further processing steps. The mixture comprising the raw granules and the release agent shall be heated to a processing temperature. The processing temperature shall be chosen to be at least as high as the lowest sintering temperature of the glass lowered by the sodium silicate hydrate. Also, the processing temperature shall be chosen to be below the melting temperature of the glass. In many cases, the sintering temperature of a glass shall be indicated by a temperature interval ranging from a lowest to a highest sintering temperature. Preferably, the processing temperature shall be chosen in a temperature interval between the lowest sintering temperature and a 50 K higher temperature.

The heating of the mixture comprising the raw granules and the release agent results in a first partial step that the pores on surfaces of the particles of the raw granules are closed by the thermal softening of the glass. Consequently, thereafter the pores on the surfaces of the particles are largely closed so that an overpressure can build up within the granular particles of the raw granules. In a second partial step, the heating of the mixture comprising the raw granules and the release agent results in dissolving the water of crystallization from the sodium silicate hydrate and thermal expansion, in particular evaporation, thereby expanding the granular particles of the raw granules and forming the expanded glass granules.

The resulting expanded glass granules shall be cooled, preferably using a cooling medium. Preferably, the release agent shall be separated from the expanded glass granules, for example by a screening procedure.

A particular advantage of the method of the invention is that it enables a low-cost production of hardly water-absorbing expanded glass granules without the need for further starting materials or complex processing steps.

According to the invention, the water of crystallization bound in the sodium silicate hydrate exhibits a sufficient expanding effect, so that, preferably, no other expanding agent is provided or used as a starting material.

Preferably, no further starting materials shall be provided or used besides the glass and the sodium silicate hydrate. The silicate hydrate is preferably provided as sodium silicate hydrate.

In a preferred embodiment of the method of the invention, the glass is provided with a proportion between 87% and 93%, while the Sodium silicate hydrate is provided with a proportion of between 7% and 13%.

The glass used as a starting material preferably comprises flinders from recycled glass and/or ground expanded glass granules. The flinders can be, for example, broken container glass or broken plate glass.

Preferably, the glass comprises between 10% and 50% ground expanded glass granules.

Preferably, powdered clay or kaolin shall be used as the release agent.

Preferably, the starting materials is ground to a fineness at which more than 90% of particles have a size of less than 32 μm.

In another preferred embodiment of the method of the invention, the ground starting materials are granulated to form the raw granules by first compressing scabs from the ground starting materials, which are then fractionated into particles of the raw granules. The scabs are preferably obtained by compressing the ground starting materials at a high pressure of more than 100 MPa.

Preferably, the particles of the raw granules, i.e., the raw granular particles have a size between 0.1 mm and 0.5 mm. Preferably, the raw granules are dried prior to the mixing with the release agent so that it can be mixed with the release agent.

The processing temperature is preferably between 700° C. and 850° C. This temperature is particularly suitable for raw granules, which are composed of flinders of recycled glass and ground expanded glass granules.

Preferably, the raw granules are heated for at least 30 min.

In a preferred embodiment of the method of the invention heating the raw granules is carried out in an indirectly heated furnace, allowing the heat to be supplied being transmitted exclusively through the furnace wall inside the furnace to the raw granules to be expanded.

Preferably, the raw granules are carried on a conveyor through the furnace. Here, in a first section comprising less than half of the conveying path, the temperature is said processing temperature. In a second section comprising the remaining conveying path, the temperature in relation to the processing temperature is lowered by a value between 10 K and 30 K. In this manner, most of the heat flux is introduced into the granules in the front section of the conveying path.

Preferably, the expanded glass granules are heated until they have a particle density between 0.9 g/cm$^3$ and 1.1 g/cm$^3$.

The expanded glass granules comprise loose expanded glass particles, most of which consist of glass, have expanded cavities and have a dense sintered surface of glass. In the production process (see above), sintering is initiated at an earlier stage by the action of the sodium silicate, followed by a very limited expansion process, the expanding effect of which is due to the water of crystallization stored in the sodium silicate. The surface of the granules is densely sintered, i.e., the surface remains largely closed compared with conventional expanded glass. Compared to conventional expanded glass, another stronger expansion does not take place, as no "traditional" expanding agent is used.

The expanded glass granules of the invention have the advantage that they can be produced at low cost, and are also suitable for applications wherein the expanded glass granules are exposed to water or aqueous solutions under high pressure, since the expanded glass granules absorb no or almost no water and are so strong, in that the expanded glass particles are not destroyed even at a high hydrostatic pressure.

Preferably, the expanded glass granules of the invention are realized in such a way that their water absorption is less than 10 wt %, that is, when it is subjected to water under conventional measurement methods (DIN V 18004:2004). Thus, upon exposure to water the effective particle gross density increases by less than 10% compared to the particle gross density (DIN V 18004). Under these conditions, expanded glass granules according to the prior art, exhibit water absorption of 20%-35%.

Exposing the expanded glass granules of the invention to water at a pressure of approximately 7 MPa (1000 psi) for a period of 1 hour, preferably, the water absorption is also less than 10 wt %.

Preferably, the expanded glass granules of the invention have a particle gross density between 0.9 g/cm$^3$ and 1.1 g/cm$^3$, so that they are suitable for applications in which the expanded glass granules are mixed with water or materials having similar densities. Due to the matching density a separation is avoided, and within processes the expanded glass granules remain distributed evenly in aqueous solutions for long periods of time even under high pressures.

The expanded glass granules of the invention have a high compressive strength, preferably, of more than 5 N/mm$^2$ (measured according to EN 13055-1).

The expanded glass granules of the invention can be produced by the method of the invention.

The invention further discloses a use of the expanded glass granules of the invention as additive in a mortar, which can be processed in particular at a hydrostatic pressure of up to 7 MPa. Said mortar is, for example, a slurry, as is required for the backfilling of earth boreholes. The expanded glass granules of the invention are suitable for this use since they exhibit very low water absorption even at high pressures, and on the other hand can be realized with a density of about 1 g/cm$^3$ for them to be distributed homogeneously in the slurry. Due to their unique characteristics, the expanded glass granules according to the invention are also suitable as filler in suspensions or in rinsing liquid, as needed, for example, for the flushing of earth boreholes. In this case, the granules act like emery to loosen buildup and deposits, and to flush them out with the rinsing liquid.

In the following, the method of the invention is described in detail in two embodiments.

In a first embodiment, 90% recycled flinders and 10% sodium silicate having 37 to 40 Be are provided as starting materials. The glass comprises 30% to 70% container glass and 30% to 70% plate glass. For example, 90 kg of flinders and 10 kg of sodium silicate can be used as starting materials. The flinders are ground in a ball mill to a fineness at which more than 80% ground glass particles have a size of less than 32 µm. The ground glass particles are mixed with the sodium silicate in an intensive mixer by introducing the sodium silicate as an aqueous solution by means of atomization as an extremely fine dispersion into the ground glass particles. In a compactor the mixed starting materials are compressed to form scabs, wherein the compressing pressure in the compactor is between 100 MPa and 200 MPa. Here, the sodium silicate acts as a binder. On the one hand, the sodium silicate ions lead to a change in the chemical composition of the granular glass and thereby to a lowering of the softening temperature, in particular, to a lowering of the sintering temperature of the glass. The high applied pressure of 100 MPa and 200 MPa causes a continuous distribution of the sodium silicate in the ground glass and very close contact of the glass particles, creating good conditions for sintering.

The scabs are then ground into raw granules which subsequently undergo a drying process. The raw granules are mixed with a suitable clay powder as a release agent in the ratio 4:1 and heated in an indirectly heated rotary tube furnace to a temperature between 700° C. and 850° C., wherein they are sintered and expanded for a period of 30 min. The water of crystallization in the sodium silicate solution has a viscosity-reducing effect and accelerates melting, so early on a densely sintered surface on the particles of the granules to be expanded is generated.

The temperature in the rotary tube furnace is set so that there is a maximum temperature already in the first third of the furnace (based on the entire conveyor path). The proportion of the water of crystallization still remaining in the particles of the granules is increasingly released and evaporated so that the pressure increases inside the particles and a foamy structure is produced. The expansion of the particles of the granules occurs only to a small extent. A densely sintered, crack-free surface of the particles of the granules is ensured by moderate heating, thereby giving priority to the melt-accelerating effect of the water of crystallization of the sodium silicate compared to its effect as an expanding agent.

After expanding the granules to the extent desired, a defined cooling of the expanded glass produced is taking place. In a further step, the expanded glass granules are separated from the release agent. The expanded glass granules produced according to this embodiment have a particle size between 0.1 mm and 1.4 mm. The bulk density is 530 g/l±10%. The particle gross density is 1.0 g/cm 5%. The particle strength has a value of 7 N/mm$^2$±10%.

In accordance with a second embodiment, 80% recycled flinders, 10% ground expanded glass granules, and 10% sodium silicate having 37 to 40 Be are used as starting materials. The recycled flinders comprise 30% to 70% container glass and 30% to 70% plate glass. For example, 80 kg of recycled flinders, 10 kg of ground expanded glass granules, and 10 kg of the sodium silicate can be used. The starting materials are processed in the same manner as in the first embodiment. The expanded glass granules produced in this manner have a particles size between 0.1 mm and 1.4 mm. The bulk density is 557 g/l. The particle gross density has a value of 1.02 g/cm$^3$±5%. The particle strength is 5.1 N/mm$^2$±10%.

The invention claimed is:

1. A method for manufacturing a swelling-glass granulate, comprising the following steps of:
preparing starting materials, including 80% to 95% glass and 5% to 20% of a water glass hydrate with a proportion of water of crystallization portion of between 1 and 2 wt. %, relative to a solid proportion, in which the water glass hydrate acts as a swelling agent and no further swelling agents are prepared as a starting material;
grinding the glass;
mixing the starting materials;
granulating the ground-up starting materials to a raw granulate;
mixing the raw granulate with a parting compound, the parting compound exhibits a portion between 10% and 40% of the mixture including the raw granulate and the parting compound;
heating the mixture including the raw granulate and the parting compound to a processing temperature that is at least as high as the lowest sintering temperature of the glass reduced by the water glass hydrate and less than the melting point of the glass, in order, in a first partial step, to close the pores at the surface of the grains of the raw granulate and, in a second partial step, to release the water of crystallization from the water glass hydrate and bring about thermal expansion, in which the grains of the raw granulate swell up and form the swelling-glass granulate; and
cooling of the swelling-glass granulate.

2. The method according to claim 1, characterized in that the glass is prepared with a proportion between 87% and 93% and a sodium silicate hydrate is prepared as a water glass hydrate with a proportion between 7% and 13%.

3. The method according to claim 1, characterized in that shards made of scrap glass and/or ground swelling-glass granulate are used as the glass, in which the glass is between 10% and 50% of the ground swelling-glass granulate.

4. The method according to claim 1, characterized in that the granulation of the ground-up starting materials to the raw granulate occurs such that conchoidal chips are first pressed out of the ground-up starting materials, preferably at a pressure of over 100 MPa, which are thereupon fractionated to the grains of the raw granulate.

5. The method according to claim 1, characterized in that the particles of the raw granulate are between 0.1 mm and 0.5 mm in size.

6. The method according to claim 1, characterized in that the processing temperature is between 700° C. and 850° C., preferably between 750° C. and 790° C.

7. The method according to claim 1, characterized in that the raw granulate is supplied on a feed path through an indirectly heated oven, in which the temperature in a first section consisting of less than half the feed path is the processing temperature, and in which in a second section consisting of the usual feed path, the temperature is reduced relative to the processing temperature to about a value between 10K and 30K.

8. The method according to claim 1, characterized in that the swelling-glass granulate remains heated until it exhibits a raw-grain density between 0.9 g/cm$^3$ and 1.1 g/cm$^3$.

9. A swelling-glass granulate consisting of loose swelling-glass grains, which consist of glass, possess swollen pore spaces, and exhibit a densely sintered surface made of glass, in which the swelling-glass granulate shows a water absorption of less than 10 wt. % and exhibits a raw grain density between 0.9 g/cm$^3$ and 1.1 g/cm$^3$.

10. A swelling-glass granulate according to claim 9, characterized in that it shows a water absorption of less than 10 wt. %, if it is exposed to water over a time period of 1 hour.

11. A swelling-glass granulate according to claim 9, characterized in that it shows a water absorption of less than 10 wt. %, if it is exposed to water over a time period of 1 hour at a pressure of about 7 MPa.

12. A swelling-glass granulate consisting of loose swelling-glass grains, which consist of glass, possess swollen pore spaces, and exhibit a densely sintered surface made of glass, in which the swelling-glass granulate shows a water absorption of less than 10 wt. % and exhibits a raw grain density between 0.9 g/cm$^3$ and 1.1 g/cm$^3$, manufactured by the method according to claim 1.

13. A method of using the swelling-glass granulate in accordance with claim 9 as an additive material in mortar or as a filler in flushing fluids comprising the steps of backfilling of earth boreholes and flushing of earth boreholes.

14. A method of using the swelling-glass granulate in accordance with claim 10 as an additive material in mortar or as a filler in flushing fluids comprising the steps of backfilling of earth boreholes and flushing of earth boreholes.

15. A method of using the swelling-glass granulate in accordance with claim 11 comprising the step of adding said granulate as an additive material in mortar or filling said granulate as a filler in flushing fluids.

16. A method of using the swelling-glass granulate in accordance with claim 12 comprising the step of adding said granulate as an additive material in mortar or filling said granulate as a filler in flushing fluids.

* * * * *